United States Patent [19]

Morita et al.

[11] Patent Number: 4,729,358
[45] Date of Patent: Mar. 8, 1988

[54] ENGINE CONTROLLING SYSTEM

[75] Inventors: Kiyomi Morita, Katsuta; Junji Miyake, Mito, both of Japan

[73] Assignee: Hitachi, Ltd., Tokyo, Japan

[21] Appl. No.: 36,476

[22] Filed: Apr. 9, 1987

[30] Foreign Application Priority Data

Apr. 9, 1986 [JP] Japan ................................. 61-81648

[51] Int. Cl.$^4$ .......................... F02D 1/04; F02D 35/00
[52] U.S. Cl. .................................... 123/416; 123/417; 123/425
[58] Field of Search ............... 123/416, 417, 412, 425, 123/421

[56] References Cited

U.S. PATENT DOCUMENTS

| | | | |
|---|---|---|---|
| 4,181,944 | 1/1980 | Yamauchi et al. | 123/417 |
| 4,368,705 | 1/1983 | Stevenson et al. | 123/416 |
| 4,414,946 | 11/1983 | Daümar et al. | 123/416 |
| 4,508,075 | 4/1985 | Takao et al. | 123/417 |
| 4,553,208 | 11/1985 | Akiyama et al. | 123/417 |
| 4,590,563 | 5/1986 | Matsamura et al. | 123/416 |
| 4,600,993 | 7/1986 | Pauwels et al. | 123/416 |

*Primary Examiner*—Raymond A. Nelli
*Attorney, Agent, or Firm*—Antonelli, Terry & Wands

[57] ABSTRACT

An engine controlling system is operative to control injection of fuel into an engine and an ignition timing thereof in accordance with predetermined maps, respectively. Each map is at a lattice pattern showing predetermined relationship between engine speed and load value determined based on the engine speed and an engine intake air flow in terms of mass flow. When the degree of the throttle valve opening is greater than a predetermined value and the engine speed and the load value read on the maps do not fall in power zones in the maps, the engine controlling system operates to increase the fuel supply and retard the ignition timing so that the increased rate of fuel supply and the retarded ignition timing fall in the power zones in the maps to prevent occurrence of a knock.

2 Claims, 6 Drawing Figures

ENGINE CONTROLLING SYSTEM

BACKGROUND OF THE INVENTION

The present invention relates to a system for controlling an internal combustion engine of the type that has an intake manifold, a throttle valve disposed in the intake manifold for movement between an idle position and a fully opened position, a fuel injection system including at least one electrically actuated fuel injector operative to inject a fuel into an air flow through the intake manifold to form an air-fuel mixture to be sucked into the engine, and an ignition system including a spark plug for igniting charges of the air-fuel mixture in an associated engine cylinder.

A controlling system for an internal combustion engine of the type specified above has been known to include an electrical control unit electrically connected to a fuel injector, a throttle position sensor operative to detect positions of a throttle valve and emit to the control unit an electrical signal representing a detected throttle valve position, an engine speed sensor operative to detect an engine speed and emit to the control unit an electrical engine-speed signal representing a detected engine speed, a temperature sensor operative to detect an engine temperature and emit a temperature signal to the control unit and a mass flow type air flow meter for detecting a mass flow of air sucked through the intake manifold into the engine. The control unit is operative to control the rate of fuel supply through the fuel injection system into the engine in accordance with a first predetermined map of a lattice pattern showing a predetermined relationship between an engine speed and a load value determined on the basis of an detected engine speed and a detected engine intake air flow. The first predetermined map contains a stoichiometrical air-fuel ratio zone below a predetermined load value for a detected engine speed and a power zone above the predetermined load value. The rate of fuel supply controlled in accordance with the first predetermined map is so determined that the engine is supplied with an air-fuel mixture of an air-fuel ratio richer than the stoichiometrical air-fuel ratio when the detected engine speed and load value fall within the power zone in the first predetermined map. The controlling unit is also electrically connected to the ignition system to control the ignition timing in accordance with a second predetermined map similar to the first predetermined map. The ignition timing controlled in accordance with the second predetermined map when the detected engine speed and the load value fall in a stoichiometrical air-fuel ratio zone in the second predetermined map is advanced than in a power zone therein.

This type of engine controlling systems has a problem that an internal combustion engine equipped with the controlling system knocks and tends to be damaged either when an internal combustion engine is operated in a high ambient air temperature as is experienced when an automobile equipped with the engine is operated in a hot district or when the automobile is operated to climb a hill at a high altitude. This is because, under such engine operating conditions, the air sucked into the engine is of a very low density and the engine is at a very high temperature. In such case, the engine throttle valve is widely opened but the engine intake air flow in terms of mass flow measured by the mass flow type air flow meter is at a smaller rate relative to the degree of the throttle valve opening. Accordingly, while the engine is operating at a heavy load condition with the throttle valve widely opened, the engine control by the controlling unit operated in accordance with the first and second predetermined maps is such that the air-fuel mixture and the ignition timing are respectively leaner and advanced than in the heavy load engine operating condition under which the engine is in fact operated.

SUMMARY OF THE INVENTION

The present invention aims at eliminating the problem discussed above.

According to the present invention, there is provided an engine controlling system for an internal combustion engine of the type specified in the first paragraph of this specification. The engine controlling system according to the invention is generally of the type discussed above, but the control unit thereof is improved to include a first judgement means operative to judge (a) as to whether the throttle valve opening is wider than a predetermined value and a second judgement means operative to judge (b) as to whether the load value and engine speed are in the power zone in the first predetermined map. When the answer to the question (a) is YES and the answer to the question (b) is NO, the control unit is operative to supply the fuel to the engine at an increased air-fuel rate and simultaneously retard the ignition timing to assure that the increased air-fuel ratio and the retarded ignition timing fall within the zones of the maps which correspond substantially to the degree of the throttle valve opening detected by the throttle position sensor.

The control unit may preferably include a further judgement means operative to judge (c) as to whether the engine temperature is higher than a predetermined temperature level. The arrangement may be such that, when the answers to the questions (a) and (c) are YES and the answer to the question (b) is NO, the control unit may operate to determine the fuel supply at the increased air-fuel ratio and retard the ignition timing. The inclusion of the further judgement means in the control unit is effective to eliminate the occurrence of an engine knock even when the engine is operated at a low altitude but in a heavy load operating condition.

The above and other objects, features and advantages of the present invention will be made more apparent by the following description with reference to the accompanying drawings.

BRIEF DESCRIPTION OF THE DRAWINGS

FIG. 6 is a chart illustrating the characterised part of the operation of a control unit of the engine controlling system.

DESCRIPTION OF THE PREFERRED EMBODIMENT

Figure 1:
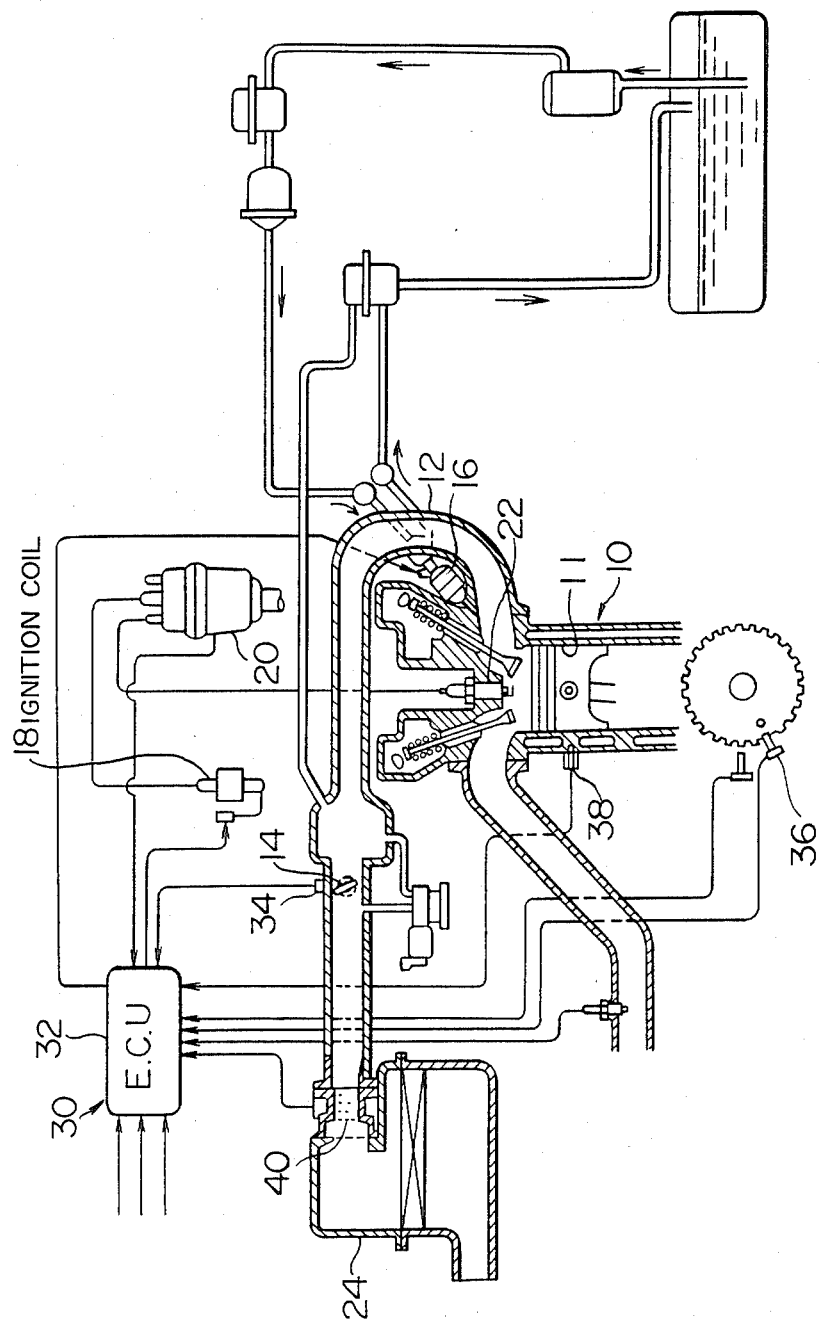
FIG. 1 is a diagrammatic illustration of an internal combustion engine equipped with an engine controlling system according to the present invention.

Referring to FIG. 1, an internal combustion engine 10 has an intake manifold and a throttle valve 14 disposed in the intake manifold 12 for movement between a closed idle position and a fully opened idle position. A conventional fuel injection system includes an electrically actuated fuel injectors only one of which is shown at 16. The injectors are operative to inject a fuel into an air flow through the intake manifold 12 so that an air fuel mixture to be sucked into the engine is formed. The fuel injection system and the fuel injector 16 are well known in the art and thus are not described in more detail herein. A conventional ignition system includes an ignition coil 18, a distributor 20 and spark plug only one of which is shown at 22 and mounted to ignite charges of air-fuel mixture in an engine cylinder 11.

The engine 10 is provided with a controlling system 30 which includes an electrical control unit 32 electrically connected to the ignition coil 18 of the ignition system and to the fuel injectors 22. A throttle position sensor 34 is mounted on the intake manifold 12 to detect varying positions of the throttle valve 14 and electrically connected to the control unit 32 to emit thereto an electrical signal representing a throttle position detected. An engine speed sensor 36 is provided to detect an engine speed and electrically connected to the control unit 32 to emit thereto an electrical engine speed signal representing an engine speed detected. A temperature sensor 38 is mounted on an engine crank case to detect the temperature of an engine cooling water and electrically connected to the control unit to emit thereto an electrical signal representing a detected temperature of the engine cooling water and thus of the engine 10. A mass-flow type air flow meter 40 is provided to detect a mass flow of an engine intake air flow through the intake menifold 12 upstream of the throttle valve 14 and just downstream of an air cleaner 24 connected to an upstream end of the intake menifold 12.

Figure 3:
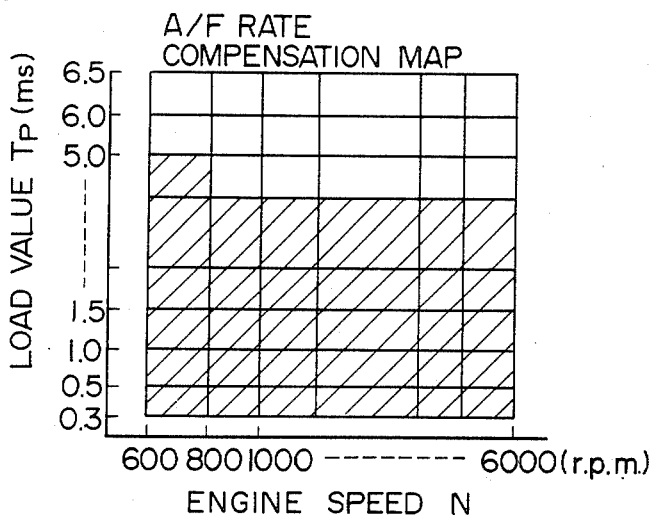
FIG. 3 shows an air-fuel ratio compensation map.

The control unit 32 is operative to control the rate of fuel supply through the fuel injectors 16 into the engine 10 in accordance with a predetermined air-fuel ratio compensation map of a lattice pattern showing a predetermined relationship between an engine speed N (r.p.m.) and a load value Tp (ms) which is determined on an detected engine speed N and a detected engine intake air flow in terms of mass flow. An example of such map is shown in FIG. 3 and includes a stoichiometrical air-fuel ration zone, which is hatched in the map shown in FIG. 3, and a power zone which is not hatched in the map.

Figure 4:
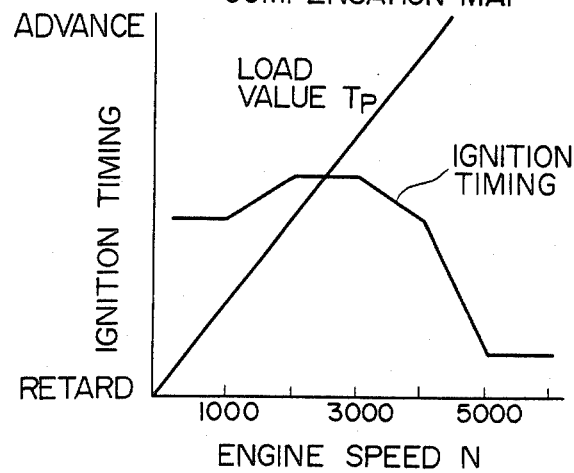
FIG. 4 shows an ignition timing compensation map.

The control unit 32 is also operative to control the ignition timing of the engine 10 in accordance with another predetermined map shown in FIG. 4.

Figure 2:
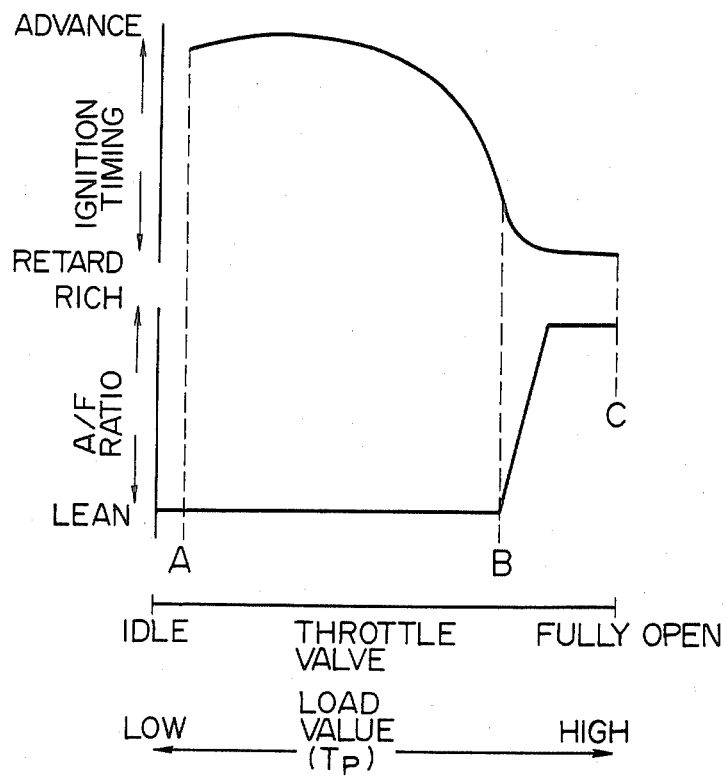
FIG. 2 graphically illustrates engine operation characteristics in respect of ignition timing combined with an air-fuel ratio relative to a throttle valve opening combined with a load value.

The control of the air-fuel ratio according to the first said map and the control of the ignition timing according to the second-said map are graphically shown in FIG. 2 wherein a zone between A and B is the stoichiometrical air-fuel ratio zone and second zone between B and C is the power zone. It will be seen in FIG. 2 that, in the power zone B-C, the richness of the air-fuel mixture is greatly increased and the ignition timing is greatly retarded than in the stoichiometrical air-fuel ratio zone A-B.

The arrangement and operation of the engine controlling system described above are conventionally known in the art. Assuming that an automotive engine having such a conventional engine controlling system is operated at a substantially sea level and at an engine speed of 1,000 r.p.m. and with a throttle valve substantially fully opened, the controlling system operates to supply the engine with a fuel at a rate corresponding to a load value Tp of 6.1 ms which falls in the power zone B-C. Accordingly, the controlling system also operates to control the ignition timing so that it is retarded to fall within the power zone B-C.

However, when the automobile equipped with the internal combustion engine is operated to climb a hill at a high altitude with the engine throttle valve widely opened, or when the automobile is operated in a high ambient air temperature as in a hot district, the mass flow level of engine intake air detected by the air flow sensor 40 is smaller or lower compared with the widely opened throttle valve position detected by the throttle position sensor 34 because the density of air is low in such situation. Accordingly, the load value Tp read on the map shown in FIG. 3 falls in the stoichiometrical air-fuel ratio zone which is the zone A-B in FIG. 2. Thus, the rate of fuel supply and ignition timing determined by the controlling unit 32 fall within the stoichiometrical air-fuel ratio zone A-B in which the air-fuel ratio is leaner than in the power zone B-C and the ignition timing is advanced than in the power zone B-C. It will be noted that, under such engine operating conditions, the air-fuel ratio should correctly be richer than in the stoichiometrical air fuel ratio zone A-B and the ignition timing should correctly be retarded than in the zone A-B because the throttle valve is widely opened.

Figure 5:
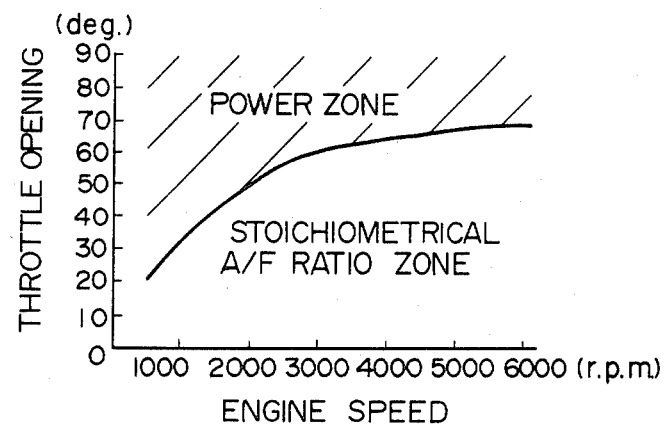
FIG. 5 shows a predetermined relationship between a throttle valve opening relative to an engine speed.

In the illustrated embodiment of the engine controlling system 30 according to the present invention, the electrical control unit 32 is improved to judge as to whether the opening of the throttle valve 14 as detected by the throttle position sensor 34 is wider than a predetermined value. This judgement is conducted at a step 100 shown in FIG. 6 and based on a predetermined relationship between the throttle opening and the engine speed, as shown in FIG. 5. If an answer to the question in the step 100 is YES, the operation of the controlling unit 32 proceeds to a next step 101 where a judgement is conducted as to whether the engine temperature detected by the temperature sensor 38 is higher than a predetermined level. If an answer to the question in the step 101 is YES, the operation proceeds to a next step 102 where a judgement is conducted as to whether the engine speed N and a load value Tp fall in a power zone in a map shown in FIG. 4. The load value Tp is given by:

$$Tp = k \times QA/N$$

where QA represents the engine intake air flow in terms of mass flow and k is constant. In the case where the answer to the question in the judgement step 100 is YES and the answer to the question in the judgement step 102 is NO, it means that the engine is operated either at a high altitude and under a heavy load or in a hot ambient air. Accordingly, the operation proceeds to a next step 103 where the control unit 32 operates to supply the fuel at an increased rate. Simultaneously, the control unit 32 operates at a step 104 to retard the ignition timing. The increased air-fuel ratio and the retarded ignition timing fall in the power zone B-C in FIG. 2, so that an engine knock, which would otherwise occur in such an engine operating condition, is avoided. The judgement step 101 is preferably added in the illustrated embodiment of the invention to check as to whether the engine is operated in a temperature range where the engine tends to knock even if the engine is operated neither at a high altitude nor in a hot ambient air.

In the case where the answers to the questions at the judgement steps 100 and 101 are both NO and the answer to the question at the judgement step 102 is YES, the operation of the control unit 32 proceeds bypassing the fuel increasing and ignition timing retarding steps 103 and 104.

What is claimed is:

1. A system for controlling an internal combustion engine having an intake manifold, a throttle valve disposed in said intake manifold for movement between an idle position and a fully opened position, a fuel injection system including at least one electrically actuated fuel injector operative to inject a fuel into an air flow through said intake manifold to form an air-fuel mixture to be sucked into the engine, and an ignition system including a spark plug for igniting charges of the air-fuel mixture in an associated engine cylinder, said controlling system including an electrical control unit electrically connected to said injector, a throttle position sensor operative to detect positions of said throttle valve and emit to said control unit an electrical throttle-position signal representing a detected throttle valve position, an engine speed sensor operative to detect an engine speed and emit to said control unit an electrical engine-speed signal representing a detected engine speed, a temperature sensor operative to detect an engine temperature and emit a temperature signal to said control unit, signal to said control unit, and a mass flow type air flow sensor for detecting a mass flow of air sucked through said intake manifold into said engine, said control unit being operative to control the rate of fuel supply through said fuel injection system into said engine in accordance with a first predetermined map of a lattice pattern showing a predetermined relationship between an engine speed and a load value determined based on an detected engine speed and a detected engine intake air flow, said first predetermined map containing a stoichiometrical air-fuel ratio zone below a predetermined load value for a detected engine speed and a power zone above said predetermined load value, the rate of fuel supply controlled in accordance with said first predetermined map being so determined that the engine is supplied with an air-fuel mixture of an air-fuel ratio richer than the stoichiometrical air-fuel ratio when the detected engine speed and load value fall within said power zone in said first predetermined map, said control unit being also electrically connected to said ignition system to control the ignition timing in accordance with a second predetermined map similar to said first predetermined map, the ignition timing controlled in accordance with said second predetermined map when the detected engine speed and the load value fall in a stoichiometrical air-fuel ratio zone in said second predetermined map being advanced than in a power zone therein, wherein the control unit includes a first judgement means operative to judge (a) as to whether the throttle valve opening is wider than a predetermined value and a second judgement means operative to judge (b) as to whether the load value and the engine speed are in the power zone in the first predetermined map, said control unit being operative to supply the fuel to the engine at an increased air-fuel ratio and simultaneously retard the ignition timing to assure that the increased air-fuel ratio and the retarded ignition timing fall within the zones of the first and second maps which correspond substantially to the degree of said throttle valve opening detected by said throttle position sensor.

2. An engine controlling system according to claim 1, wherein said control unit further includes a third judgement means operative to judge (c) as to whether the engine temperature detected by said temperature sensor is higher than a predetermined level, the arrangement being such that, when the answers to the questions (a) and (c) are both YES and the answer to the question (b) is NO, the control unit is operative to supply the fuel at said increased air-fuel ratio and retard the ignition timing.

* * * * *